United States Patent [19]

Baier

[11] Patent Number: 5,014,283
[45] Date of Patent: May 7, 1991

[54] ARRANGEMENT FOR EQUALIZING AND DEMODULATING BINARY CONTINUOUS-PHASE ANGLE-MODULATED DATA SIGNALS WITH MODULATION INDEX 0.5

[75] Inventor: Alfred Baier, Eckental, Fed. Rep. of Germany

[73] Assignee: U.S. Philips Corporation, New York, N.Y.

[21] Appl. No.: 377,367

[22] Filed: Jul. 7, 1989

[30] Foreign Application Priority Data

Jul. 9, 1988 [DE] Fed. Rep. of Germany ....... 3823374

[51] Int. Cl.$^5$ ............................................. H04L 5/12
[52] U.S. Cl. ....................................... 375/15; 375/86; 333/18
[58] Field of Search ...................... 375/12, 14, 15, 57, 375/86, 108; 333/18

[56] References Cited

U.S. PATENT DOCUMENTS

| | | | |
|---|---|---|---|
| 3,947,768 | 3/1976 | Desblache et al. | 375/15 |
| 4,603,393 | 7/1986 | Laurent et al. | 375/86 |
| 4,716,577 | 12/1987 | Oexmann | 375/15 |
| 4,794,624 | 12/1988 | Braun et al. | 375/108 |

OTHER PUBLICATIONS

R. Sadr et al., "Generalized Minimum Shift-Keying Modulation Techniques", IEEE Transactions on Communications, vol. 36, No. 1, Jan. 1988, pp. 32-40.
C. E. Sundberg, "A Class of Jointly Power and Bandwidth Efficient Digital Modulation Schemes with Constant Amplitude", IEEE Communications Magazine, vol. 24, No. 4, pp. 25-38, Apr. 1986.
N. A. B. Svensson, "On Optimum and Suboptimum Coherent Detection of Continuous Phase Modulation on a Two-Ray Multipath Fading Channel", IEEE Transactions on Communications, vol. COM-35, No. 10, pp. 1041-1049, Oct. 1987.

Primary Examiner—Benedict V. Safourek
Assistant Examiner—Young Tse
Attorney, Agent, or Firm—Jack D. Slobod

[57] ABSTRACT

A preprocessing unit is inserted between a baseband converter and an equalizer/detector for performing a signal processing which corresponds to a phase rotation of the CPM-signal in the baseband represented by in phase and quadrature components. The phase rotation progresses in discrete steps of 90° per bit interval of the binary data signal contained in the CPM-signal. The introduction of the preprocessing unit renders it possible to use a comparatively simple conventional equalizer/detector for binary pulse amplitude modulated signals (PAM-signals) for equalizing and detecting binary CPM-signals received in distorted form. When the equalizer/detector is adaptive, a further preprocessing unit is inserted between a channel estimator and adjusting inputs of the equalizer/detector.

20 Claims, 1 Drawing Sheet

ARRANGEMENT FOR EQUALIZING AND DEMODULATING BINARY CONTINUOUS-PHASE ANGLE-MODULATED DATA SIGNALS WITH MODULATION INDEX 0.5

BACKGROUND OF THE INVENTION

1. Field of the Invention

The invention relates to an arrangement for equalizing and demodulating a binary continuous-phase angle-modulated data signal with a modulation index $h=0.5$ which includes a baseband converter for producing both quadrature components of a received modulated data signal in the baseband, and an equalizer/detector to which both baseband quadrature components are applied for recovering the original binary data signal.

2. Description of the Related Art

In information transmission systems comprising dispersive transmission channels the signal to be transmitted is distorted by delay differences and phase shifts. In digital information transmission these distortions become apparent as intersymbol interference in the received signal. In addition, the received signal may be affected by noise or similar interference signals. In order to recover the original data content of the signal, it is necessary to equalize the received signal.

Equalizers for data signals with linear modulation, such as, for example, Pulse Amplitude Modulation (PAM) or Quadrature Amplitude Modulation (QAM), are very extensively investigated and described in the literature. Their technical realization is usually possible with acceptable cost and design efforts. This is quite different for equalizers for data signals with non-linear angle modulation, such as, for example, a frequency modulation with continuous-phase variation, which is denoted as Continuous Phase Modulation (CPM). The equalization methods and arrangements for CPM-signals, as disclosed in the literature, are generally very complex and expensive and therefore rather unsuitable for an advantageously priced technical realization. This holds more specifically for CPM-modulation types using a Partial-Response method, that is to say, in which the signal variation of the modulated signal does not only depend on the instantaneous data bit to be transmitted, but in a defined manner also on a fixed number of data bits immediately preceding this data bit. Examples of important binary Partial-Response-CPM modulation methods are the Gaussian Minimum Shift-Keying (GMSK) and Generalized Tamed Frequency Modulation (GTFM).

An arrangement for equalizing and demodulating a Partial-Response-CPM signal is known from, for example, the article "On Optimum and Suboptimum Coherent Detection of Continuous Phase Modulation on a Two-Ray Multipath Fading Channel", N. A. B. Svensson, IEEE Transactions on Communications, Vol. COM-35, No. 10, pages 1041-1049, Oct. 1987. This arrangement is based on a demodulator for distortion-free received Partial-Response-CPM signals, disclosed in the article "Continuous Phase Modulation", C.-E. Sundberg, IEEE Communications Magazine, Vol. 24, No. 4, pages 25-38, Apr. 1986. FIG. 10, page 31 of the latter publication shows a quadrature receiver which is composed of a baseband converter and a Viterbi detector. The baseband converter comprises a bandpass filter to which the input signal is applied and two mixers, each of which receives the bandpass-filtered signal and each of which is followed by a low-pass filter. The mixing carrier signal of the first mixer has, compared with the mixing carrier signal of the second mixer, a phase which lags by 90°, the frequency of the mixing carrier signals corresponding to the carrier frequency of the received modulated signal. The low-pass filters arranged subsequent to the mixers only pass the low-frequency signal part of the mixing product. The low-pass-filtered output signal of the first mixer is commonly referred to as the in-phase component (I-component), the low-pass-filtered output signal of the second mixer is commonly referred to as the quadrature-phase component (Q-component). These two quadrature components are applied to a Viterbi detector, which recovers the transmitted data in accordance with the Maximum Likelihood Sequence Estimation method (MLSE). In the quadrature receiver for distorted CPM-signals in accordance with Svensson's paper, the Viterbi detector is replaced by a Viterbi equalizer (see FIG. 2, page 1043 of said paper), which also operates in accordance with the MLSE-method. At the same time it performs the equalization, the Viterbi equalizer effects the detection, i.e. the recovery of the original data to be transmitted. It then takes account of both the structure, the Partial-Response property of the CPM-modulation and the characteristics of the distorting transmission channel. Basically, other types of equalizers such as, for example, decision-feedback equalizers can also be used instead of the Viterbi equalizer, c.f. said publication by Svensson.

The fact that the CPM-modulation is a non-linear angle modulation and that in addition to the linear intersymbol interference by the dispersive transmission channel also non-linear intersymbol interference by the Partial-Response property of the modulation occurs, is the reason that equalizers for CPM-signals are significantly more complex and more expensive than equalizers for linearly modulated data signals such as PAM-signals or QAM-signals. From Svensson's paper it is evident that both the special structure of the phase-continuous frequency modulation, the non-linear partial-response characteristic of the modulation, and also the linear intersymbol interference by the dispersive transmission channel must be taken into account in a complicated manner in the equalizer. This requires the real-time execution of a very large number of extensive multiplications and additions of complex quantities.

SUMMARY OF THE INVENTION

The present invention has for its object to structure an arrangement of the type defined in the opening paragraph, such that the costs and design efforts for the equalization and demodulation of binary CPM-modulated data signals are reduced. More specifically, with a view to a low-cost technical implementation, it is desirable to provide an arrangement for equalizing and demodulating binary CPM-signals, in which—the performance remaining the same—additional costs of complex arithmetic operations stipulated by the type of modulation are avoided.

According to the invention, this object is achieved in that a preprocessing unit is inserted between the baseband converter and the equalizer/detector for performing a signal processing which corresponds to a phase rotation, progressing in discrete steps in a predetermined sense, of the modulated data signal represented by the baseband quadrature components, the magnitude of the discrete phase rotating step per bit interval of the binary data signal contained in the modulated signal amounting to 90°.

The preprocessing operation in accordance with the invention converts the original quadrature components I and Q into quadrature components I' and Q' of a modulated data signal whose values at the bit clock instants substantially correspond to the values of the quadrature components at the output of the baseband converter which would have been received when linearly modulated binary data signals, such as binary PAM-signals or binary PSK-signals, were transmitted. Because of the fact that generally the baseband conversion will be affected with time-dependent carrier phase errors and the dispersive transmission channels will be subject to likewise time-dependent multi-path propagations, not only an in-phase component I' will occur at the output of the preprocessing unit, but also a quadrature-phase component Q' unequal to zero, which however will be taken into account in known manner during the equalization, so that for the detection only the real numerical values of the equalized in-phase component are to be processed. Consequently, the preprocessing operation in accordance with the invention does not need to take the complicated structure of the non-linear angle modulation of a CPM signal into account anymore, but the equalization can be based on the significantly simpler structure of a linear amplitude modulation.

In accordance with an advantageous embodiment, the preprocessing unit is implemented such that the quadrature components I and Q are preprocessed at the rate of the bit clock, wherein in a first clock interval of the bit clock both quadrature components are conveyed without change, in a subsequent second clock interval one of the two quadrature components is inverted, in a third clock interval both quadrature components are inverted and in a fourth clock interval that quadrature component is inverted that was not inverted in the second clock interval, in the second and fourth clock intervals the two quadrature components being interchanged in addition to the described inversions. This processing schedule is periodically continued with a cycle of four clock intervals.

The introduction of the low-cost preprocessing unit renders it possible to use a comparatively simple, conventional equalizer/detector for binary PAM signals for the equalization and demodulation of distortedly received binary CPM-signals. Consequently, it is possible to use proven, reliable circuit concepts for equalizer/detectors for linearly modulated data signals, and the cost and design efforts expressed in the number of arithmetic operations to be performed in the equalizer/detector are significantly reduced.

More specifically, a large part of the complex multiplications required in the CPM-equalizer according to the publication by Svensson are no longer necessary, and the remaining operations are reduced to real multiplications or very simple sign-controlled add/substract operations.

In order to demonstrate the simplifications achieved by the equalizer/detector according to the invention, the MLSE equalizer for CPM-signals according to Svensson's paper is compared to an MLSE equalizer for binary PAM-signals in the following descritpion. As an example, a binary CPM scheme with a modulation index of h=0.5, a bit period T, a partial-response frequency pulse of L bit periods duration, and a channel impulse response of K bit periods duration is assumed.

According to Svensson's paper the CPM equalizer operates on a state trellis with $2^{L+K}$ states. At the instant $t_n = nT$ the state vector $$Z_n = (\theta_n, b_{n-1}, \ldots, b_{n-L-K+1})$$

is given by the past data bits $b_{n-1}, \ldots, b_{n-L-K+1}$ assuming the values $+/-1$ and by the phase state $\theta_n$. The phase state $\theta_n$ depends on all past data bits and assumes the values 0 or $\pi$ for n even and $\pi/2$ or $3\pi/2$ for n odd. Specifically $$\theta_n = \left( \pi/2 \sum_{i < n-L-K+1} b_i \right) \bmod 2\pi.$$

The fact that the phase state $\theta_n$ has to be tracked for each data path evolved by the Viterbi algorithm when tracing through the trellis is a crucial point which makes the CPM equalizer complex and sophisticated. This drawback is avoided if the preprocessing unit according to the invention is employed.

As a further drawback, the CPM equalizer incorporates a very complex metric calculation which involves a reconstruction of the non-linear partial-reponse CPM signal segments for $2^{L+K-1}$ different data patterns and a convolution of these segments with the channel impulse response h(t). With the received complex baseband signal denoted as x(t) and the CPM phase transition function denoted as q(t), the metric increments are given by $$M_n = \int_{nT}^{(n+1)T} |x(t) - s(t, b_n, Z_n)|^2 \, dt$$

where $$s(t, b_n, Z_n) = \exp\left[ j\theta_n + j\pi \sum_{i=n-L-K+1}^{n} b_i q(t - iT) \right] * h(t).$$

If the preprocessing unit according to the invention is employed, a much simpler MLSE equalizer for binary PAM-signals can be used for equalizing and detecting the CPM-signal. The PAM equalizer operates on a regular state trellis with $2^{L+K}$ states. The state vector at time $t_n = nT$ is $$Z_n = (b_{n-1}, \ldots, b_{n-L-K}).$$

Since a phase state variable does not occur any longer, the Viterbi-MLSE processing is substantially simplified.

Moreover, the signal processing complexity of the metric calculation is much lower, since the reference signal $s(t, b_n, Z_n)$ is now given by $$s(t, b_n, Z_n) = \sum_{i=n-L-K}^{n} b_i h'(t - iT)$$

where h'(t) is a modified impulse response of the transmission channel including the partial-response characteristic of the CPM scheme. A channel estimator operating on the preprocessed counterpart of the received signal x(t) is able to produce directly an estimate of h'(t) with no additional processing necessary. Whereas the calculation of the reference signal $s(t, b_n, Z_n)$ requires a lot of complex multiplications in the case of the CPM MLSE equalizer, only a few add/substract operations are required in the case of the PAM MLSE equalizer (recalling that the symbols $b_i$ are $+/-1$ only).

It is to be noted that when the binary $h=0.5$ CPM-signal is based on a direct mapping of the date bits $b_i$ onto the instantaneous frequency (as assumed above), the data bits delivered by the PAM MLSE equalizer with the preprocessing according to the invention have to be differentially decoded in order to recover the original data $b_1$.

In a further embodiment of the invention the equalizer/detector is in the form of an adaptive equalizer/detector and there is further provided a channel estimator, for producing an estimation, consisting of two quadrature components, of the instantaneous channel impulse response, the quadrature components being applied as adjusting signals to the adaptive equalizer/detector via a second preprocessing unit.

BRIEF DESCRIPTION OF THE DRAWING

The invention and its advantages will now be described in greater detail by way of example with reference to embodiments shown in the accompanying drawings, in which.

DETAILED DESCRIPTION OF THE PREFERRED EMBODIMENTS

Figure 1:
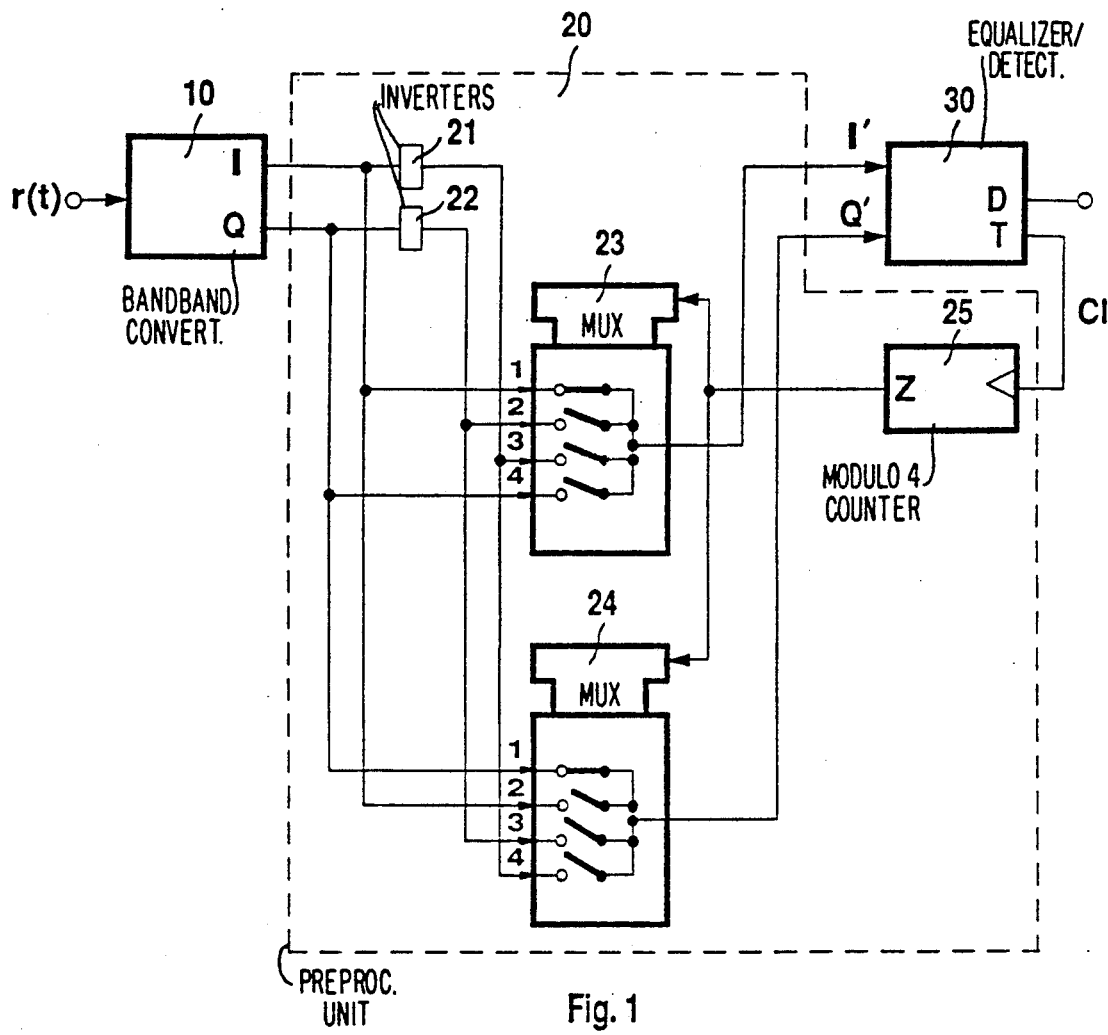
FIG. 1 shows an embodiment of the invention.

The embodiment shown in FIG. 1 illustrates an arrangement for equalizing and demodulating a received signal r(t). This arrangement forms part of a receiver, not shown, of a transmission system. Digital data to be transmitted are modulated in a transmitter, not shown, on a carrier signal by means of a non-linear CPM-modulator. The send signal is applied to the receiver via a transmission path. Transmission paths may be transmission lines, for example optical fibres, but may alternatively be wireless transmission paths, for example, radio channels. Delay differences, reflections and other effects occurring on the transmission path may be the cause that in the receiver section, instead of the send signal, only a signal r(t) is received which is distorted and beset by noise or other interferences.

The distorted received signal r(t) is applied to a baseband converter 10 which, in known manner, is formed by a bandpass filter, two mixers and a respective a lowpass filter arranged subsequent to each of the mixers, two quadrature carriers being applied to the mixers, whose frequency corresponds to the carrier frequency of the received signal r(t). The baseband converter 10 supplies at its first output an in-phase component I and at its second output a quadrature-phase component Q. The I-component is applied to a first input 1 of a first multiplexer 23 and to a second input 2 of a second multiplexer 24 and also to a first inverter 21. The output of the first inverter 21 is connected to the third input 3 of the first multiplexer 23 and to the fourth input 4 of the second multiplexer 24. The Q-component is applied to the fourth input 4 of the first multiplexer 23 and to the first input 1 of the second multiplexer 24 and also to a second inverter 22. The output of the second inverter 22 is connected to the second input 2 of the first multiplexer 23 and to the third input 3 of the second multiplexer 24. The output of the first multiplexer 23 is connected to the first input of an equalizer/detector 30, the output of the second multiplexer 24 is connected to a second input of this equalizer/detector. The equalizer/detector supplies from its output D demodulated data which—at least in good transmission conditions—correspond to the originally transmitted data.

In one possible embodiment the equalizer/detector 30 is realized by an MLSE equalizer using the Viterbi algorithm. Embodiments of Viterbi MLSE equalizers for linear modulation schemes such as PAM our QAM are described in G. D. Forney, "Maximum-likelihood sequence estimation of digital sequences in the presence of intersymbol interference", IEEE Transactions on Information Theory, Vol. IT-18, pages 363–378, May 1972, and in G. Ungerboeck, "Adaptive maximum-likelihood receiver for carrier-modulated data-transmission systems", IEEE Transactions on Communications, Vol. COM-22, pages 624–636, May 1974. According to the invention, a Viterbi-MLSE equalizer for binary PAM is used with the modulating data symbols assumed to take on the values $+1$ and $-1$ only.

In addition, the equalizer/detector 30 supplies from its output T a bit clock Cl which is in synchronism with the received signal r(t) and is applied to the clock input of a counter 25. This clock signal can however alternatively be produced, by way of example, by a separate clock pulse generating unit. The two inverters 21, 22, the two multiplexers 23, 24 and the counter 25 constitute together a preprocessing unit 20.

The counter 25 is a modulo-4 counter whose counting outputs are connected to control inputs of the two multiplexers 23 and 24. Based on the instantaneous counter position zero to three, the multiplexers select from the four inputs 1, 2, 3, 4 always one input whose signal is conveyed to the output of the relevant multiplexer for the duration of one clock interval of the bit clock Cl. FIG. 1 shows the switching state of the multiplexers for the counter position zero. At each clock pulse of the bit clock Cl the counter position is incremented one step, the counter position zero following again at the subsequent clock pulse of the bit clock Cl after the counter position three has been reached. At the counter position zero the first inputs 1 of the two multiplexers, at the counter position one the second inputs 2 of the multiplexers, at the counter position two the third inputs 3, and at the counter position three the fourth inputs 4 are switched to the outputs of the relevant multiplexers 23 to 24, respectively.

The following Table shows the signals supplied from the outputs of the multiplexers in dependence on the counter positions of the counter 25.

| Z | E | I' | Q' |
|---|---|----|----|
| zero | 1 | I | Q |
| one | 2 | $-Q$ | I |
| two | 3 | $-I$ | $-Q$ |
| three | 4 | Q | $-I$ |

The column Z shows the counter positions of the counter 25, the column E shows which inputs 1, 2, 3, 4 of the multiplexer 23, 24 are switched-through at the respective counter positions. The column I' lists the signal components occurring at the outputs of the first multiplexer and the column Q' lists the signal components occurring at the outputs of the second multiplexer, which components I' and Q' result from the wiring diagram of the multiplexer inputs to the baseband converter 10 and the inverters 21, 22.

This Table shows that at the counter position zero the two quadrature components I and Q are conveyed without any change. At the counter position one, the Q-component is inverted and interchanged with the I-component. At the counter position two the two quadrature components are inverted, but switched-through in their original arrangement. Finally, at the counter position three, in contradistinction to the counter position one, only the I-component is inverted and the two quadrature components are again interchanged.

The following, second Table show a different sequence of the inversions and interchanges effected at the rate of the bit clock Cl.

| Z | E | I' | Q' |
|---|---|----|----|
| zero | 1 | I | Q |
| one | 2 | Q | $-I$ |
| two | 3 | $-I$ | $-Q$ |
| three | 4 | $-Q$ | I |

This Table differs from the first Table in that at the counter position one the I-component is inverted instead of the Q-component and that at the counter position three the Q-component is inverted instead of the I-component, the two signal components I and Q also here being interchanged at these two counter positions. This sequence can be obtained by a small change in the wiring of the multiplexer inputs. Both circuits are equally suitable for performing the invention.

In the shown embodiment of the invention the two quadrature components I and Q applied to the two inverters and multiplexers have already been converted into a representation by digital data words by an analog-to-digital converter which is included in the baseband converter 10 but is not shown. To that end, the multiplexers are structured as digital multiplexers, the inverters, depending on the representation of the data words originating from the analog-to-digital converter, are structured as sign inverters or as complement producers, respectively.

In a further embodiment, not shown, the preprocessing unit is partially implemented with analog circuit elements. The baseband converter 10 is not provided with analog-to-digital converters and consequently produces the quadrature components I and Q as an analog signal. The two inverters 21 and 22 are then structured as inverting amplifiers having a unity gain factor, the two multiplexers 23 and 24 are analog multiplexers. The wiring of the multiplexers 23, 24 has not changed compared with the embodiment shown in FIG. 1. An analog-to-digital converter is now arranged between a respective output of a multiplexer 23, 24 and a respective input of the digitally realized equalizer/detector 30.

For the data transmitted in the example described a defined number of data bits may be combined in one data frame. With the aid of a frame synchronizing signal recovered from the received data signal the instant at which the counter 25 starts counting can then easily be synchronized with the start of a data frame. As a result thereof the first input of the two multiplexers is always switched through at, for example, the first data bit of each data frame.

In an embodiment, not shown, the equalizing portion of the equalizer/detector 30 is in the form of what is commonly denoted an adaptive equalizer. For example by recursive adaptation or by channel estimation based on the observation of the preprocessed quadrature components I' and Q' the equalizer/detector adapts itself to the transmission properties of the transmission path.

When an adaptive equalizer/detector is used, a frame synchronization of the counters or multiplexers, respectively, is not necessary. In this case, a phase lead or a phase lag of the multiplexers appears for the adaptive equalizer/detector as a constant phase shift through a multiple of 90°, which the equalizer/detector cancels during the adaptation procedure just as if it were a constant phase shift occurring on the transmission path.

Figure 2:
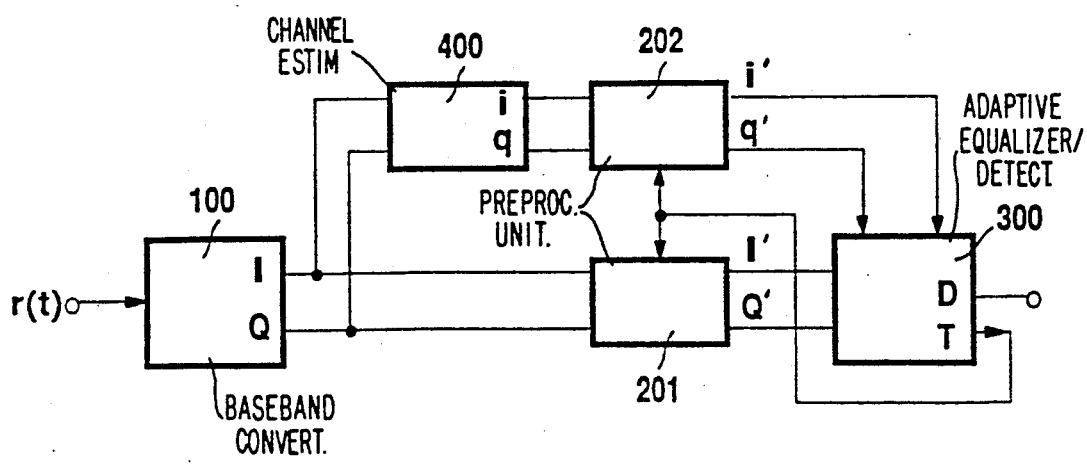
FIG. 2 shows an embodiment having an adaptive equalizer/detector.

FIG. 2 shows an embodiment of an arrangement for equalizing and demodulating a binary angle-modulated data signal comprising a baseband converter 100, an adaptive equalizer/detector 300 and also a first and a second preprocessing unit 201, 202 and a channel estimator 400. Both preprocessing units 201, 202 correspond as regards their action to the preprocessing unit 20 already described in the first embodiment.

Each data frame of the transmitted signal contains a defined bit sequence as a training signal. With the aid of this known training signal the signal distortions occurring on the transmission path are recorded in detail and evaluated. The two quadrature components I and Q are applied on the one hand directly to the channel estimator 400 and on the other to the adaptive equalizer/detector 300 via the first preprocessing unit 201. The channel estimator 400 evaluates the training signal that is contained in distorted form in the two quadrature components I and Q and in known manner produces an estimation of the instantaneous channel impulse response. This channel impulse response also consists of two quadrature components i and q. These two quadrature components are applied to the second preprocessing unit 202 which, by inversion and interchange in the manner described in the foregoing, produces two signals i' and q'. These preprocessed signal components i', q' are applied to adjusting inputs of the adaptive equalizer/detector 300. Using these signals, coefficients of the adaptive equalizer/detector 300 are adjusted such that the signal distortions occurring on the transmission path are eliminated or taken into consideration.

Also in the embodiment shown in FIG. 2 of an adaptive equalizer/detector the respective counters and multiplexers of the preprocessing units 201 and 202 need not be absolutely synchronized with the data frame. The respective counters and multiplexers of the preprocessing units 201 and 202 must however be in synchronism with each other, that is to say their initial states must be in a defined relation to each other in each data frame.

Also program-controlled signal processors are suitable for performing equalization and demodulation. By preprocessing the signal components, it also being possible that these preprocessing operations are realized by means of the signal processors themselves, decisive advantages are also obtained here. By reducing the cost and design efforts of the computations, the hardware and/or sorfware costs are reduced and also the signal processing time is shortened in this manner.

What is claimed is:

1. An arrangement for equalizing and demodulating a binary continuous-phase angle-modulated data signal with a modulation index h=0.5 received from a channel, said arrangement comprising:
   a baseband converter means for producing at its outputs a first pair of baseband quadrature components representing a received modulated data signal containing a binary data signal;

a preprocessing means havings inputs coupled to the outputs of the baseband converter means for producing at its outputs a second pair of baseband quadrature components from said first pair by performing a signal processing which corresponds to a phase rotation of the modulated data signal represented by the first pair of baseband quadrature components by progressing in discrete phase steps of 90°, in the same sense, per bit interval of the binary data signal; and an equalizer/detector means, fed by the outputs of said preprocessing means, for recovering said binary data signal.

2. An arrangement as claimed in claim 1, wherein the equalizer/detector means comprises an adaptive equalizer/detector means having adjusting signal inputs and further comprising a channel estimator means, coupled to the outputs of the baseband converter means, for producing from the first pair of baseband quadrature components an estimation of the instantaneous channel impulse response in the form of a third pair of quadrature components which are coupled to the adjusting signal inputs of the adaptive equalizer/detector means.

3. An arrangement as claimed in claim 1, wherein the preprocessing means comprises a first preprocessing means, and wherein the equalizer/detector comprises an adaptive equalizer/detector means having adjusting signal inputs and further comprising a channel estimator means, coupled to the outputs of the baseband converter means, for producing from the first pair of baseband quadrature components an estimation of the instantaneous channel impulse response in the form of a third pair of quadrature components which are applied to the adjusting siganl inputs of the adaptive equalizer/detector means via a second preprocessing means, the first and second preprocessing means effecting the same signal processing operations in sychronism with each other.

4. An arrangement as claimed in claim 1, wherein the preprocessing means comprirse means for selectively conveying the signals at its inputs to its outputs either interchanged or non-interchanged and either inverted or non-inverted in accordance with a cycle of four clock intervals such that in a first clock interval both signals at its inputs are coveyed to its outputs non-interchanged and non-inverted, in a subsequent second clock interval one of the two signals at its inputs is coveyed inverted and the other of the two signals at its inputs is conveyed non-inverted, in a subsequent third clock interval both signals at its inputs are conveyed inverted and in a subsequent fourth clock interval said other of the two siganls at its inputs that was not conveyed inverted in the second clock interval is conveyed inverted, and in the second and fourth clock intervals the signals at its inputs are conveyed interchanged in addition to the described inversions.

5. An arrangement as claimed in claim 4, wherein the period of duration of a clock interval corresponds to the length of a bit interval of said binary data signal.

6. An arrangement as claimed in claim 1, wherein the preprocessing means comprises a first inverter whose input is connected to a first of the outputs of the baseband converter means, and a second inverter whose input is connected to a second of the outputs of the baseband converter means such that the first and second of the outputs of the baseband converter means and the outputs of the first and second inverters comprises a set of four outputs, a modulo-4 counter, first and second multiplexers each having its own output and its own series of four inputs connected to said set of four outputs, the order of connection of said set of four outputs to the series of four inputs of said first multiplexer being different from the order of connection of said set of four outputs to the series of four inputs of the second multiplexer, said series of four inputs of the resepective first and second multiplexers being sequentially connected to the output of the respective first and second multiplexer in accordance with a sequence of states of the modulo-4 counter, the outputs of the first and second multiplexers being connected to the inputs of the equalizer/detector means.

7. An arrangement as claimed in claim 6, wherein the modulo-4 counter is controlled by a frame synchronization signal.

8. An arrangement as claimed in claim 6, wherein a first of the series of four inputs of the first multiplexer is connected to the first of the outputs of the baseband converter means, a first of the series of four inputs of the second multiplexer is connected to the second of the outputs of the baseband converter means, a second of the series of inputs of the first multiplexer is connected to the output of the second inverter, a second of the series of inputs of the second multiplexer is connected to the first of the outputs of the baseband converter means, a third of the series of inputs of the first multiplexer is connected to the output of the first inverter, a third of the series of inputs of the second multiplexer is connected to the output of the second inverter, a fourth of the series of inputs of the first multiplexer is connected to the second of the outputs of the baseband converter means, and a fourth of the series of inputs of the second multiplexer is connected to the output of the first inverter.

9. An arrangement as claimed in claim 6, a first of the series of four inputs of the first multiplexer is connected to the first of the outputs of the baseband converter means, a first of the series of four inputs of the second multiplexer is connected to the second of the outputs of the baseband converter means, a second of the series of inputs of the first multiplexer is connected to the second output of the baseband converter, a second of the series of inputs of the second multiplexer is connected to the output of the first inverter, a third of the series of inputs of the first multiplexer is connected to the output of the first inverter, a third of the series of inputs of the second multiplexer is connected to the output of the second inverter, a fourth of the series of inputs of the first multiplexer is connected to the output of the second inverter, and a fourth of the series of inputs of the second multiplexer is connected to the first of the outputs of the baseband converter.

10. An arrangement as claimed on claim 1, wherein the equalizer/detector means is an equalizer/detector suitable for binary 0°/180° phase-shift keyed modulated data signals.

11. An arrangement as claimed in claim 1, wherein the equalizer/detector means is an equalizer/detector suitable for binary pulse amplitude modulated data signals.

12. An arrangement as claimed in claim 2, wherein the preprocessing means comprises means for selectively conveying the singnals at its inputs to its outputs either interchanged or non-interchanged and either inverted or non-inverted in accordance with a cycle of four clock intervals such that in a first clock interval both signals at its inputs are conveyed to its outputs non-interchanged and non-inverted, in a subsequent second clock interval, one of the two signals at its inputs is conveyed inverted and the other of the two signals at its inputs is conveyed non-inverted, in a subsequent third clock interval both signals at its inputs are conveyed inverted and in a subsequent fourth clock interval said other of the two signals at its inputs that was not conveyed inverted in the second clock interval is conveyed inverted, and in the second and fourth clock intervals the signals at its inputs are conveyed interchanged in addition to the described inversions.

13. An arrangement as claimed in claim 12, wherein the period of duration of a clock interval corresponds to the length of a bit interval of said binary data signal.

14. An arrangement as claimed in claim 13, wherein the preprocessing means comprises a first inverter whose input is connected to a first of the outputs of the baseband converter means, and a second inverter whose input is connected to a second of the outputs of the baseband converter means such that the first and second of the outputs of the baseband converter means and the outputs of the first and second inverters comprises a set of four outputs, a modulo-4 counter, first and second multiplexers each having its own output and its own series of four inputs connected to said set of four outputs, the order of connection of said set of four outputs to the series of four inputs of said first multiplexer being different from the order of connection of said set of four outputs to the series of four inputs of the second multiplexer, said series of four inputs of the respective first and second multiplexers being sequentially connected to the output of the respective first and second multiplexer in accordance with a sequence of states of the modulo-4 counter and one, the outputs of the first and second multiplexers being connected to the inputs of the equalizer/detector means.

15. An arrangement as claimed in claim 3, wherein the preprocessing means comprises means for selectively conveying the signals at its inputs to its outputs either interchanged or non-interchanged and either inverted or non-inverted in accordance with a cycle of four clock intervals such that in a first clock interval both signals at its inputs are conveyed to its outputs non-interchanged and non-inverted, in a subsequent second clock interval, one of the two signals at its inputs is conveyed inverted and the other of the two signals at its inputs is conveyed non-inverted, in a subsequent third clock interval both signasl at its inputs are conveyed inverted and in a subsequent fourth clock interval said other of the two signals at its inputs that was not conveyed inverted in the second clock interval is conveyed inverted, and in the second and fourth clock intervals the signals at its inputs are conveyed interchanged in addition to the described inversions.

16. An arrangement as claimed in claim 15, wherein the period of duration of a clock interval corresponds to the length of a bit interval of said binary data signal.

17. An arrangement as claimed in calim 16, wherein the preprocessing means comprises a first inverter whose input is connected to a first of the outputs of the baseband converter means, and a second inverter whose input is connected to a second of the outputs of the baseband converter means such that the first and second of the outputs of the baseband converter means and the outputs of the first and second inverters comprise a set of four outputs, a modulo-4 counter, first and second multiplexers each having its own output and its own series of four inputs connected to said set of four outputs, the order of connection of said set of four outputs to the series of four inputs of said first multiplexer being different from the order of connection of said set of four outputs to the series of four inputs of the second multiplexer, said series of four inputs of the respective first and second multiplexers being sequentially connected to the output of the respective first and second multiplexer in accordance with a sequence of states of the modulo-4 counter, the outputs of the first and second multiplexers being connected to the inputs of the equalizer/detector means.

18. An arrangement as claimed in claim 2, wherein the preprocessing means comprises a first inverter whose input is connected to a first of the outputs of the baseband converter means, and a second inverter whose input is connected to a second of the outputs of the baseband converter means such that the first and second of the outputs of the baseband converter means and the outputs of the first and second inverters comprises a set of four outputs, a modulo-4 counter, first and second multiplexers each having its own output and its own series of four inputs connected to said set of four outputs, the order of connection of said set of four outputs to the series of four inputs of said first multiplexer being different from the order of connection of said set of four outputs to the series of four inputs of the second multiplexer, said series of four inputs of the respective first and second multiplexers being sequentially connected to the output of the respective first and second multiplexer in accordance with a sequence of states of the modulo-4 counter, the outputs of the first and second multiplexers being connected to the inputs of the equalizer/detector means.

19. An arrangement as claimed in claim 3, wherein the preprocessing means comprises a first inverter whose input is connected to a first of the outputs of the baseband converter means, and a second inverter whose input is connected to a second of the ouputs of the baseband coverter means such that the first and second of the outputs of the baseband coverter means and the outputs of the first and second inverters comprise a set of four outputs, a modulo-4 counter, first and second multiplexers each haivng its own output and its own series of four inputs connected to said set of four outputs, the order of connection of said set of four outputs to the series of four inputs of said first multiplexer being different from the order of connection of said set of four outputs to the series of four inputs of the second multiplexer, said series of four inputs of the respective first and second multiplexers being sequentially connected to the output of the respective first and second multiplexer in accordance with a sequence of states of the modulo-4 counter, the outputs of the first and second multiplexers being connected to the inputs of the equalizer/detector means.

20. An arrangement as claimed in claim 4, wherein the preprocessing means comprises a first inverter whose input is connected to a first of the outputs of the baseband converter means, and a second inverter whose input is connected to a second of the outputs of the baseband converter means such that the first and second of the outputs of the baseband converter means and the outputs of the first and second inverters comprise a set of four outputs, a modulo-4 counter, first and second multiplexers each having its own output and its own series of four inputs connected to said set of four outputs, the order of connection of said set of four outputs to the series of four inputs of said first multiplexer being different from the order of connection of said set of four outputs to the series of four inputs of the second multiplexer, said series of four inputs of the respective first and second multiplexers being sequentially connected to the output of the respective first and second multiplexer in accordance with a sequence of states of the modulo-4 counter, the outputs of the first and second multiplexers being connected to the inputs of the equalizer/detector means.

* * * * *